(12) United States Patent
Hishida et al.

(10) Patent No.: US 11,355,984 B2
(45) Date of Patent: Jun. 7, 2022

(54) INSULATOR, AND STATOR AND MOTOR COMPRISING SAME

(71) Applicant: Panasonic Intellectual Property Management Co., Ltd., Osaka (JP)

(72) Inventors: Mitsuoki Hishida, Osaka (JP); Hiroshi Yoneda, Osaka (JP); Hirokatsu Kunitomo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 92 days.

(21) Appl. No.: 16/641,226

(22) PCT Filed: Jun. 5, 2018

(86) PCT No.: PCT/JP2018/021595
§ 371 (c)(1),
(2) Date: Feb. 21, 2020

(87) PCT Pub. No.: WO2019/058649
PCT Pub. Date: Mar. 28, 2019

(65) Prior Publication Data
US 2020/0220410 A1 Jul. 9, 2020

(30) Foreign Application Priority Data
Sep. 20, 2017 (JP) .............................. JP2017-180487

(51) Int. Cl.
*H02K 3/46* (2006.01)
*H02K 3/34* (2006.01)
(Continued)

(52) U.S. Cl.
CPC ................. *H02K 3/46* (2013.01); *H02K 3/34* (2013.01); *H02K 3/28* (2013.01); *H02K 3/30* (2013.01);
(Continued)

(58) Field of Classification Search
CPC .............. H02K 3/28; H02K 3/30; H02K 3/32; H02K 3/34; H02K 3/345; H02K 3/46; H02K 3/50
(Continued)

(56) References Cited

U.S. PATENT DOCUMENTS 6,356,001 B1  3/2002  Nishiyama et al.
9,270,148 B2  2/2016  Van Nimmen et al.
(Continued)

FOREIGN PATENT DOCUMENTS

CN  106208474 A   12/2016
DE  102011081030 A1  2/2013
(Continued)

OTHER PUBLICATIONS

Kanada et al., English Machine Translation of JP 2013-247698 (Year: 2013).*
(Continued)

*Primary Examiner* — Rashad H Johnson
(74) *Attorney, Agent, or Firm* — McDermott Will & Emery LLP

(57) ABSTRACT

An insulator includes a part to be wound with a coil; a first flange; and a second flange. The first flange is formed at the side of the part closer to a core segment, and includes a coil guide groove that guides the coil to the part. The second flange is formed at the side of the part closer to a distal end of a teeth. The coil guide groove includes a first guide groove and a second guide groove symmetrical with respect to a radial plane. Each of the first and second guide grooves and—extends at an acute angle from an inner surface of the first flange.

20 Claims, 16 Drawing Sheets

(51) Int. Cl.
  *H02K 3/50* (2006.01)
  *H02K 3/32* (2006.01)
  *H02K 3/30* (2006.01)
  *H02K 3/28* (2006.01)

(52) U.S. Cl.
  CPC .............. *H02K 3/32* (2013.01); *H02K 3/345* (2013.01); *H02K 3/50* (2013.01)

(58) Field of Classification Search
  USPC ......... 310/179, 180, 194, 208, 215, 216.105
  See application file for complete search history.

(56) References Cited

U.S. PATENT DOCUMENTS

| | | | | |
|---|---|---|---|---|
| 11,171,532 | B2* | 11/2021 | Watanabe | H02K 1/146 |
| 2009/0127972 | A1* | 5/2009 | Ishida | H02K 1/148 |
| | | | | 310/216.074 |
| 2010/0181863 | A1* | 7/2010 | Murakami | H02K 3/522 |
| | | | | 310/215 |
| 2011/0291519 | A1* | 12/2011 | Modi | H02K 3/28 |
| | | | | 310/215 |
| 2013/0009512 | A1 | 1/2013 | Tashiro et al. | |
| 2013/0187513 | A1 | 7/2013 | Hashimoto et al. | |
| 2014/0009029 | A1* | 1/2014 | Schmid | H02K 23/00 |
| | | | | 29/596 |
| 2014/0327336 | A1 | 11/2014 | Ewert et al. | |
| 2015/0028715 | A1 | 1/2015 | Tsuiki et al. | |
| 2015/0288239 | A1* | 10/2015 | Yuda | H02K 3/522 |
| | | | | 310/215 |
| 2015/0311762 | A1* | 10/2015 | Chai | H02K 3/325 |
| | | | | 310/215 |
| 2016/0352175 | A1 | 12/2016 | Kim et al. | |
| 2020/0220415 | A1* | 7/2020 | Hishida | H02K 21/16 |

FOREIGN PATENT DOCUMENTS

| | | |
|---|---|---|
| JP | H11-122855 A | 4/1999 |
| JP | 2006-115565 A | 4/2006 |
| JP | 2008-206322 A | 9/2008 |
| JP | 2013-153589 A | 8/2013 |
| JP | 2013-247698 A | 12/2013 |
| JP | 2016-226278 A | 12/2016 |
| WO | 2011/118357 A1 | 9/2011 |

OTHER PUBLICATIONS

Ewert et al., English Machine Translation of DE 102011081030 (Year: 2011).*
Kang et al., English Machine Translation of CN106208474A (Year: 2016).*
International Search Report issued in corresponding International Patent Application No. PCT/JP2018/021595, dated Aug. 14, 2018, with English translation.
Extended European Search Report issued in corresponding European Patent Application No. 18859026.9, dated Sep. 25. 2020.

* cited by examiner

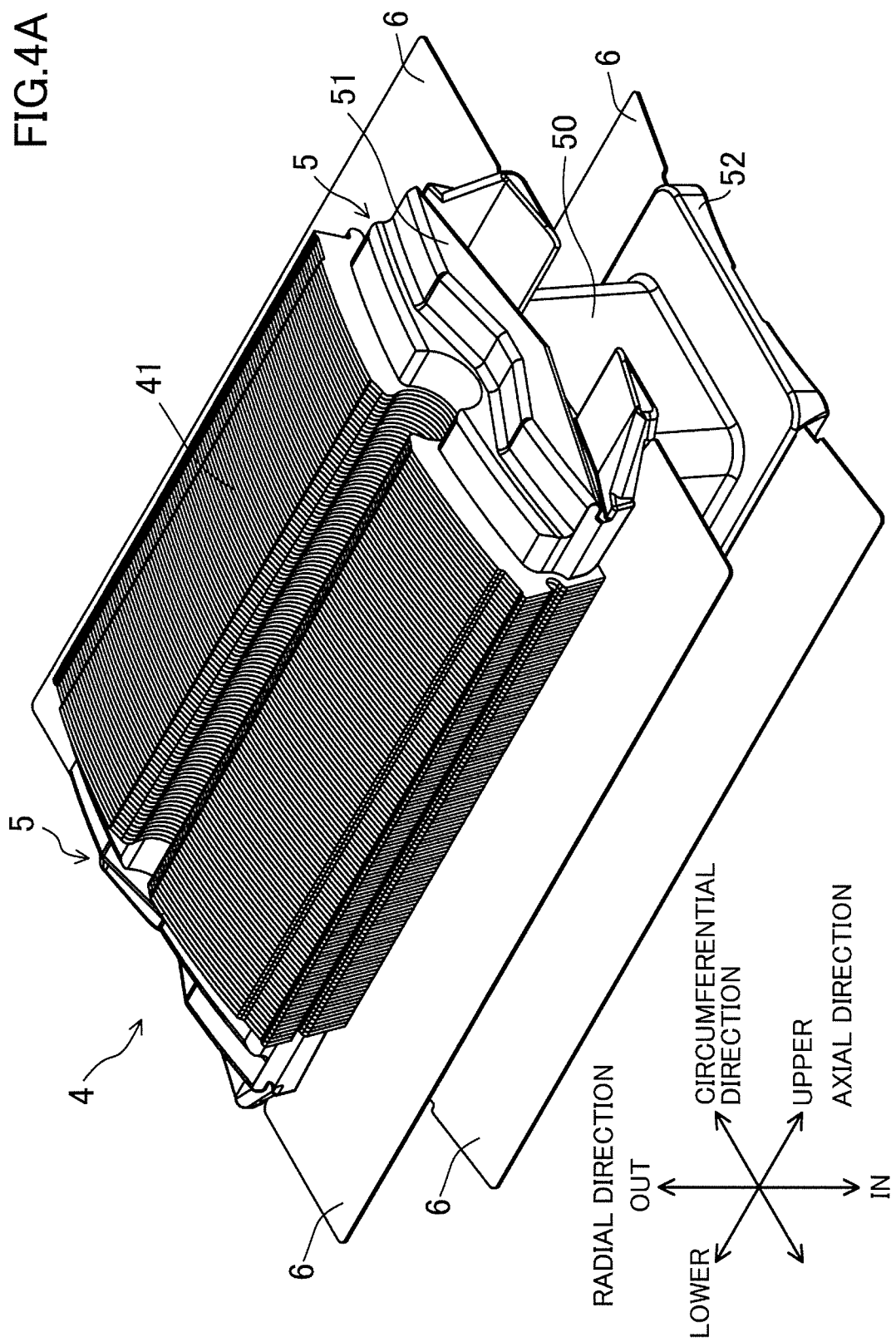

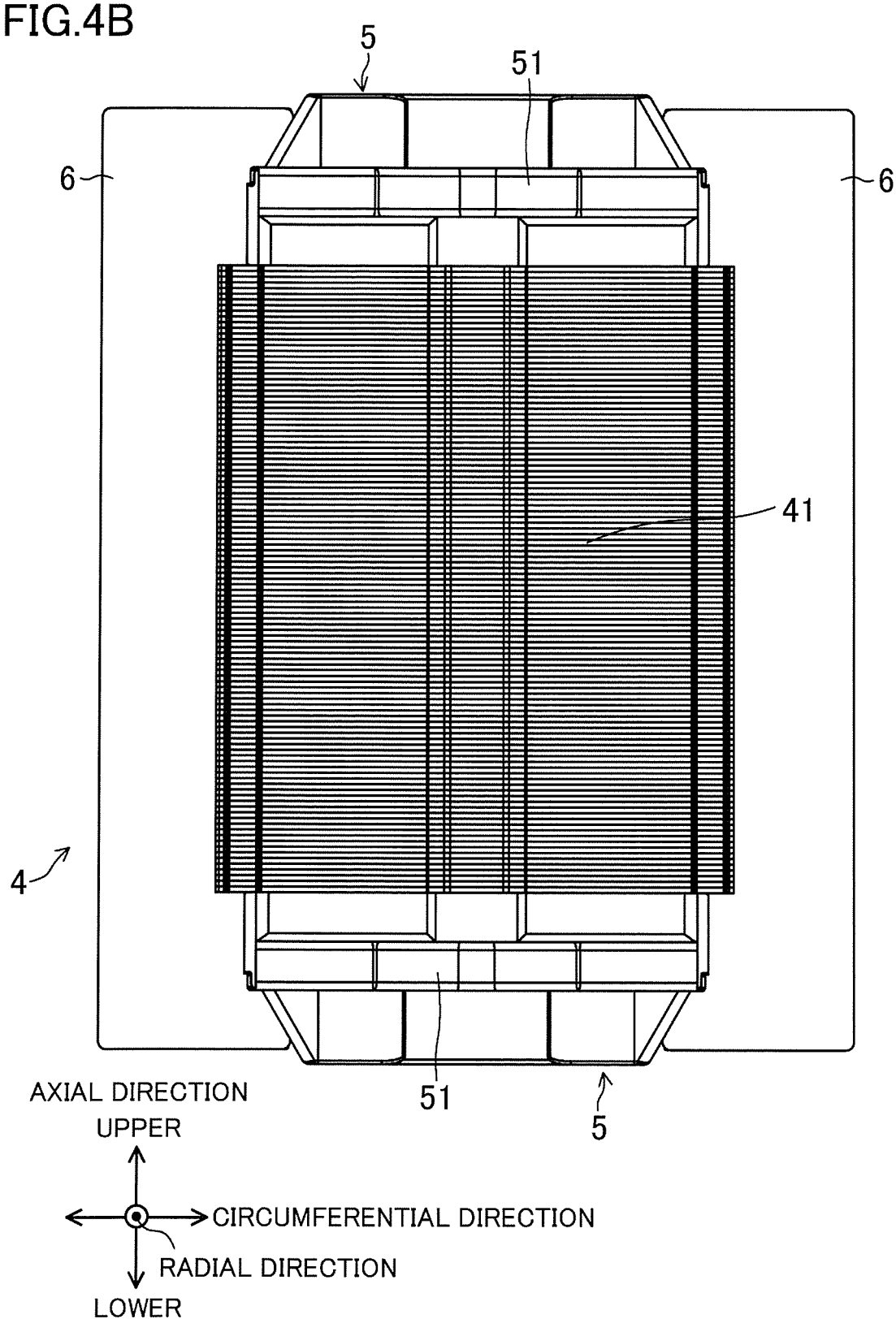

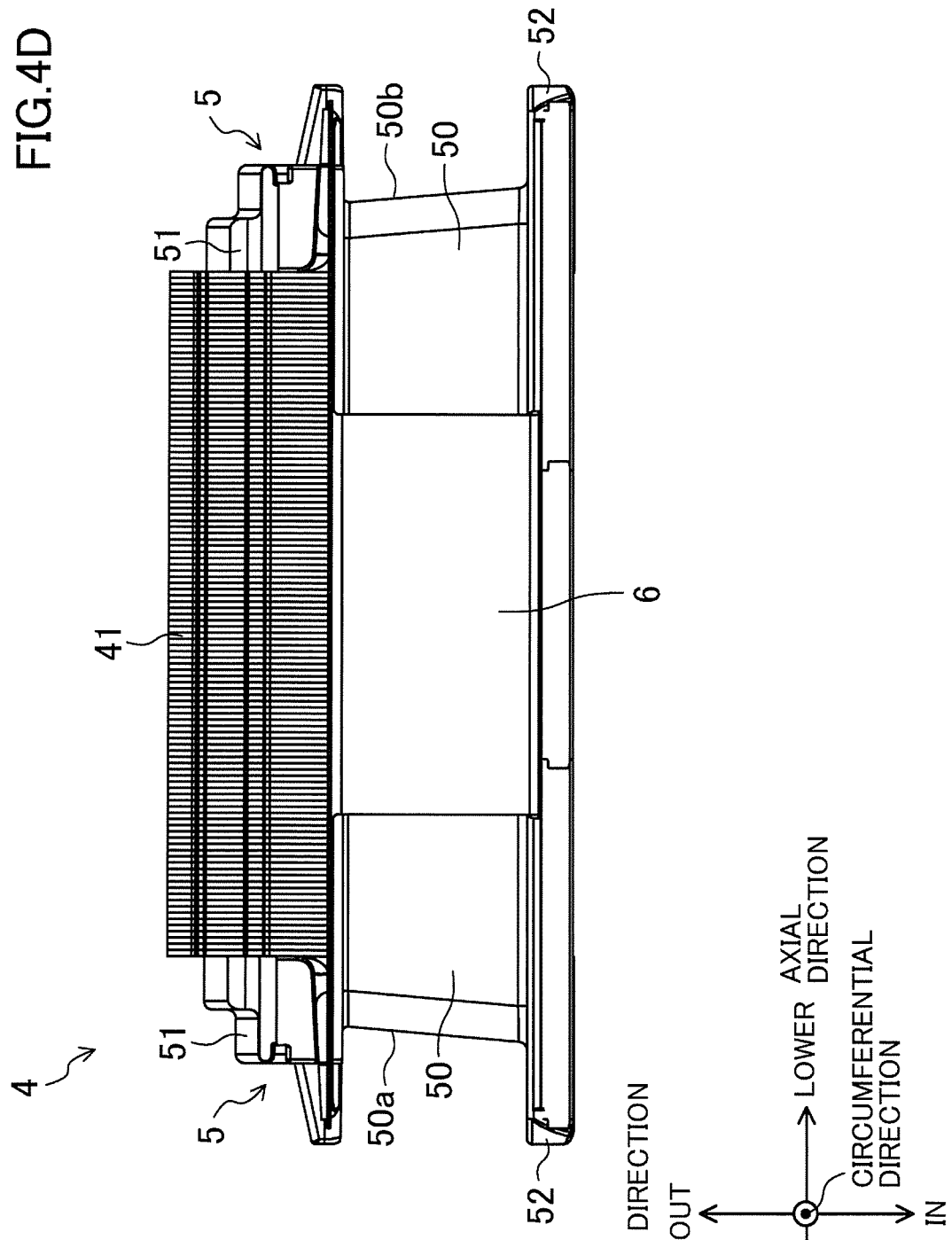

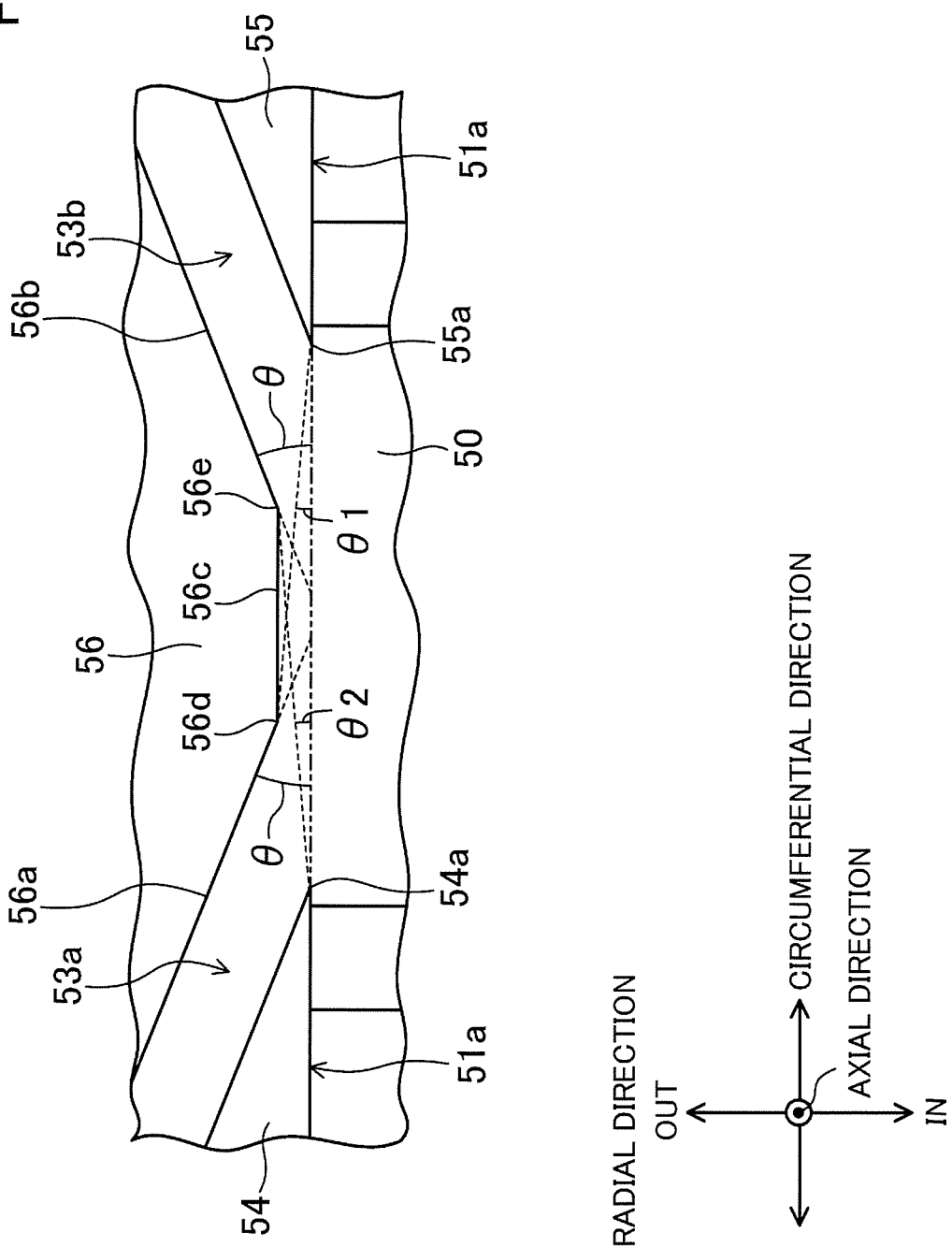

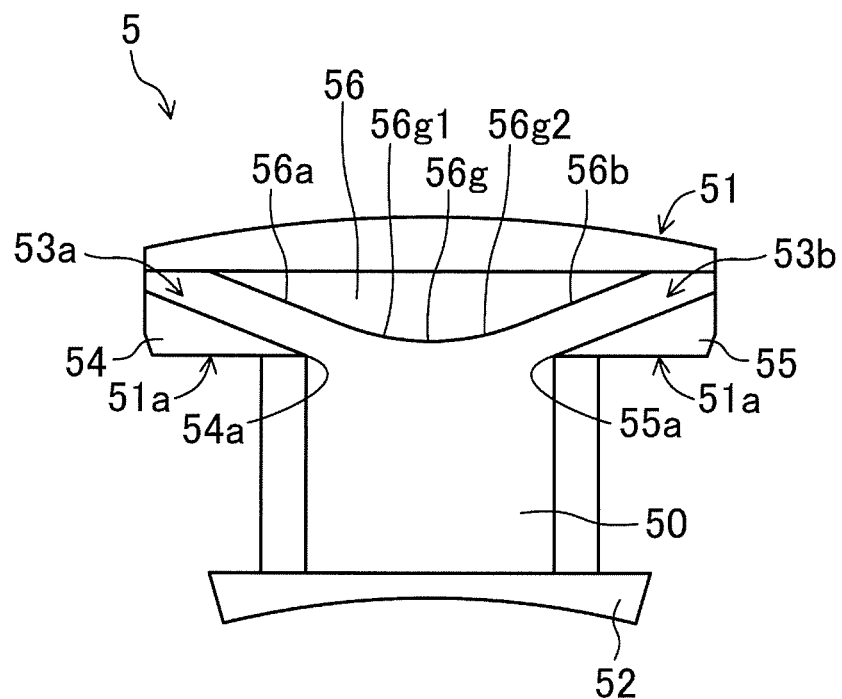

INSULATOR, AND STATOR AND MOTOR COMPRISING SAME

CROSS-REFERENCE OF RELATED APPLICATIONS

This application is a U.S. national stage application of U.S.C. § 371 of International Patent Application No. PCT/JP2018/021595 filed on Jun. 5, 2018, which claims the benefit of Japanese Patent Application No. 2017-180487 filed on Sep. 20, 2017, the contents all of which are incorporated herein by reference.

TECHNICAL FIELD

The present invention relates to an insulator wound with a coil, a stator and a motor including the insulator.

BACKGROUND ART

In recent years, there is an increasing demand for motors for industrial and in-vehicle applications. In particular, there is a demand for an improvement in the efficiency and a reduction in the costs of motors.

An increase in the space factor of a coil disposed in a slot of a stator is known as one method of improving the efficiency of a motor. An increase in the coil space factor reduces a loss caused by a current flowing through the coil when the motor is driven.

Regularly wound coils which are regularly wound around teeth of a stator are generally known as a structure to improve a coil space factor. Various configurations are suggested to achieve such coils (see, e.g., Patent Documents 1 to 4). For example, Patent Document 1 suggests a regularly wound coil by forming a step or a slope inside a flange at one or each end of the cylinder of an insulating coil bobbin wound with a coil. Patent Document 2 discloses a regularly wound coil by forming a groove for holding a wound coil in a side surface of an insulator that is attached to a tooth to insulate the coil from the tooth.

CITATION LIST

Patent Documents

PATENT DOCUMENT 1: Japanese Unexamined Patent Publication No. H11-122855
PATENT DOCUMENT 2: Japanese Unexamined Patent Publication No. 2006-115565
PATENT DOCUMENT 3: U.S. Pat. No. 6,356,001
PATENT DOCUMENT 4: PCT International Publication No. WO 2011/118357

SUMMARY OF THE INVENTION

Technical Problem

The insulators and coil bobbins described above are generally formed of resin materials using molds. On the other hand, the performance of a motor may vary depending on user specifications. Thus, even if the same stator core and teeth are used, the diameter of a coil and the number of turns are varied to adjust, for example, the value of the current flowing through the coil so that the performance of the motor meets the individual specifications.

However, the conventional configurations disclosed in Patent Documents 1 and 2 require a change in the width of the holding groove in accordance with the diameter of the coil or a change in the width of the step or the angle of the slope. It is thus necessary to reform the mold to form insulators each time, thereby increasing the costs.

The present invention is conceived in view of the above problems. It is an object of the present invention to provide an insulator regularly woundable with a coil, even if the diameter of the coil is changed.

Solution to the Problem

In order to achieve the objective, an insulator according to the present invention has a coil guide groove including a first guide groove and a second guide groove. The first guide groove allows a coil to obliquely enter a part to be wound with the coil as viewed in the axial direction. The second guide groove is radially symmetrical with the first guide groove.

Specifically, the insulator according to the present invention includes: a part to be wound with a coil, the part covering an axial end surface of a tooth protruding from a core segment and a part of at least both circumferential side surfaces of the tooth; a first flange continuous with the part to be wound with the coil at one of sides closer to a proximal end or a distal end of the tooth, and including a coil guide groove that guides the coil to the part to be wound with the coil; and a second flange continuous with the part to be wound with the coil at the other of the sides closer to the proximal end or the distal end of the tooth. The coil guide groove includes a first guide groove and a second guide groove symmetrical with respect to a radial plane, and each of the first and second guide grooves extends at an acute angle θ from an inner surface of the first flange facing the second flange.

According to this configuration, even if a coil with a different diameter is wound around the insulator, the winding starting part of the coil is regularly woundable around the part to be wound with the coil, thereby achieving a regularly wound coil as a whole. In addition, the same insulator is applicable to the cases where the coil is wound clockwise and counterclockwise. This configuration improves the design freedom of the stator and eventually of the motor.

The first flange includes, in a region other than the first and second guide grooves: a first part between the first guide groove and the part to be wound with the coil; a second part between the second guide groove and the part to be wound with the coil; and a third part between the first and second guide grooves.

In one preferred embodiment, the third part includes a corner at an opening end of the first guide groove closer to the second flange, and a plane parallel to an axial direction and passing through the corner and a second end of the second part, which is an opening end of the second guide groove closer to the second flange, forms an angle θ1 with the inner surface of the first flange, the angle θ1 being acute and equal to or lower than the angle θ.

In one preferred embodiment, the third part includes a corner at an opening end of the second guide groove closer to the second flange, and a plane parallel to an axial direction and passing through the corner and a first end of the first part, which is an opening end of the first guide groove closer to the second flange, forms an angle θ2 with the inner surface of the first flange, the angle θ2 being acute and equal to or lower than the angle θ.

The third part may include a corner at an intersection between an opening end of the first guide groove closer to the second flange and an opening end of the second guide groove closer to the second flange. A plane parallel to an axial direction and passing through the corner and a second end of the second part, which is an opening end of the second guide groove closer to the second flange, may form an angle θ1, with the inner surface of the first flange, the angle θ1 being acute and equal to or lower than the angle θ. A plane parallel to the axial direction and passing through the corner and a first end of the first part, which is the opening end of the first guide groove closer to the second flange, may form an angle θ2, with the inner surface of the first flange, the angle θ2 is being acute and equal to or lower than the angle θ.

These configurations gradually reduce the angle at which the coil enters the part to be wound with the coil, and allow the coil to be wound further along the inner surface of the first flange.

In one preferred embodiment, the corner is located farther from the part to be wound with the coil in relation to the inner surface of the first flange.

This configuration provides the angles θ1 and θ2 lower than or equal to the angle θ, thereby allowing the coil to be wound further along the inner surface of the first flange.

In one preferred embodiment, at least one of the first and second guide grooves includes a coil lock that locks a winding starting part or a winding end part of the coil.

This configuration reduces deformation and movement of the winding starting part of the coil. This improves the regularity of the winding start or end part of the coil, thereby easily providing a regularly wound coil.

In one preferred embodiment, the coil lock is a protrusion from a side surface of at least one of the first and second guide grooves, and each of the first and second guide grooves includes one or more protrusions including the protrusion.

This configuration allows reliable locking of the winding starting or end part of the coil in the insulator and easily provides a regularly wound coil.

The first and second guide grooves may be grooves tapered toward bottoms. Each of the tapered grooves may serve as the coil lock.

In one preferred embodiment, the coil lock is located at at least one of an inlet of the first guide groove and an outlet of the second guide groove.

This configuration reduces slack of the winding starting or end part of the coil with a different wire diameter and allows reliable locking of the coil in the insulator, thereby easily providing a regularly wound coil.

A stator according to the present invention includes: insulators, each being the insulator, on both axial end surfaces of teeth, each of which is the tooth of the core segment; and a plurality of stator segments, each formed by winding the coil of a winding wire around the part to be wound with the coil of the insulator. The stator segments are connected to each other in a ring, and the teeth protrude radially inward in the ring.

This configuration increases the coil space factor in the stator.

In one preferred embodiment, the coil is regularly wound around the part to be wound with the coil.

In one preferred embodiment, a space between the teeth circumferentially adjacent to each other serves as a slot that houses the coil, and in the slot, insulating paper that insulates associated one of the core segments and associated one of the teeth from the coil covers a side surface of the associated one of the teeth and partially overlaps the first and second flanges of the insulator in the axial direction.

This configuration allows for reliable electrical insulation between the teeth adjacent to each other along the circumference of the stator.

The motor according to the present invention at least includes: the stator; and a rotor including a rotary shaft located more radially inward in relation to the stator at a predetermined distance.

This configuration increases the coil space factor in the stator, and improves the efficiency of the motor.

Advantages of the Invention

As described above, the present invention achieves a regularly wound coil with reduced winding failure, even if coils with different diameters are wound.

BRIEF DESCRIPTION OF THE DRAWINGS

FIG. 4A is a perspective view of the part surrounded by a broken line shown in FIG. 1.

FIG. 4B is a side view of the structure shown in FIG. 4A as viewed in a radial direction.

FIG. 4D is a side view of the structure shown in FIG. 4A as viewed in a circumferential direction.

FIG. 5B is an enlarged schematic view of the part surrounded by a broken line shown in FIG. 5A.

FIG. 7B is a schematic view of a main part of further another insulator as viewed in the axial direction.

DESCRIPTION OF EMBODIMENTS

Embodiments of the present invention will be described in detail with reference to the drawings. The following description of advantageous embodiments is mere examples in nature, and is not at all intended to limit the scope, applications or use of the present disclosure.

First Embodiment

[Configurations of Motor and Stator]

Figure 1:
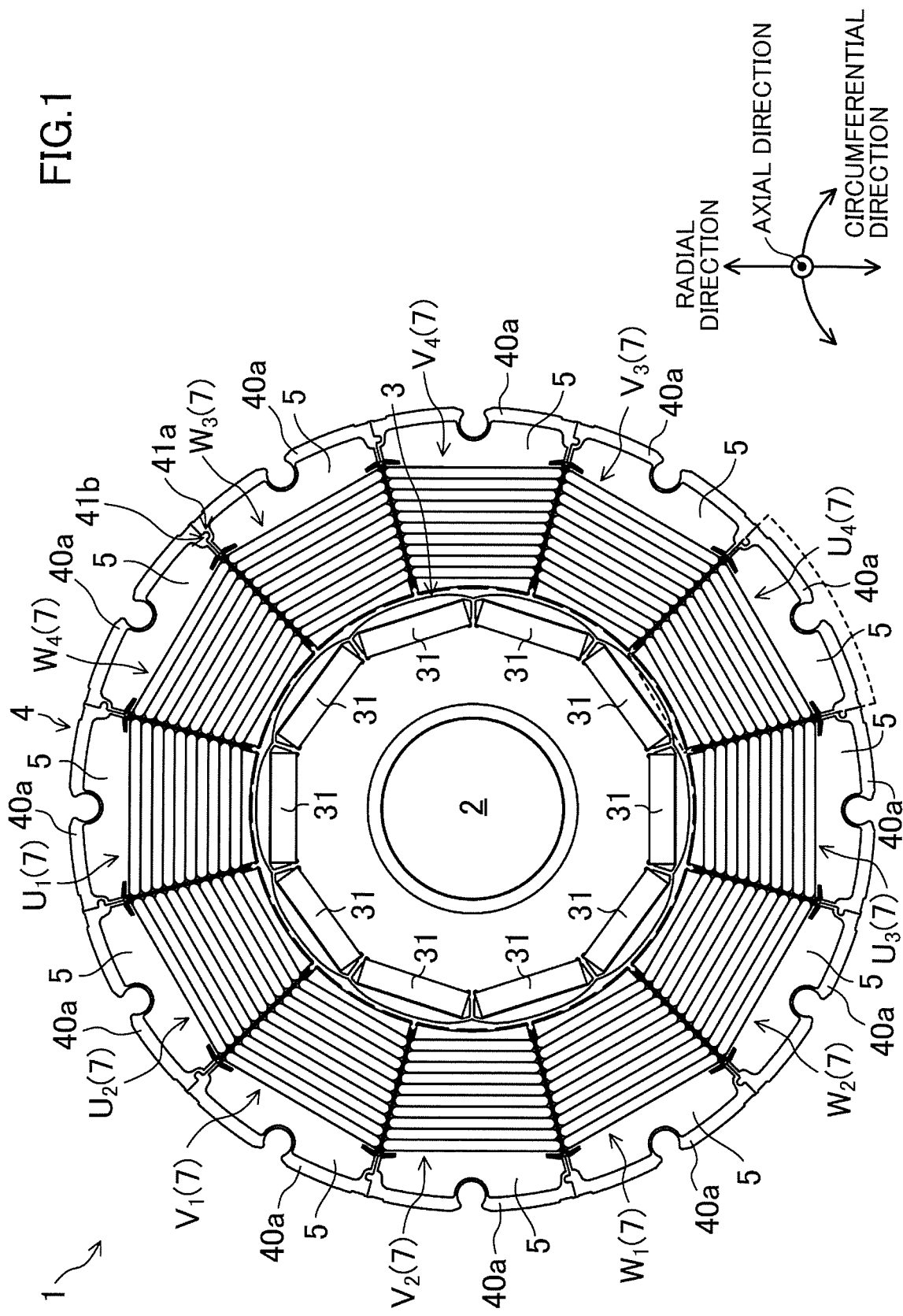
FIG. 1 is a top view of a motor according to a first embodiment.
Figure 2:
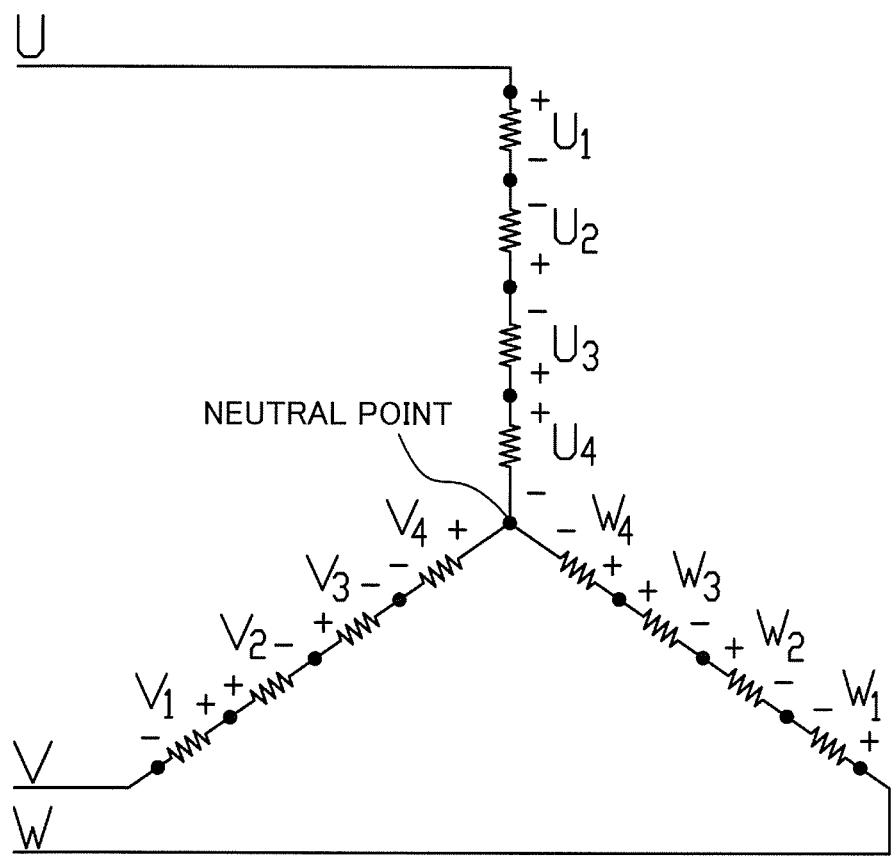
FIG. 2 is an equivalent circuit diagram of the motor shown in FIG. 1.
Figure 3:
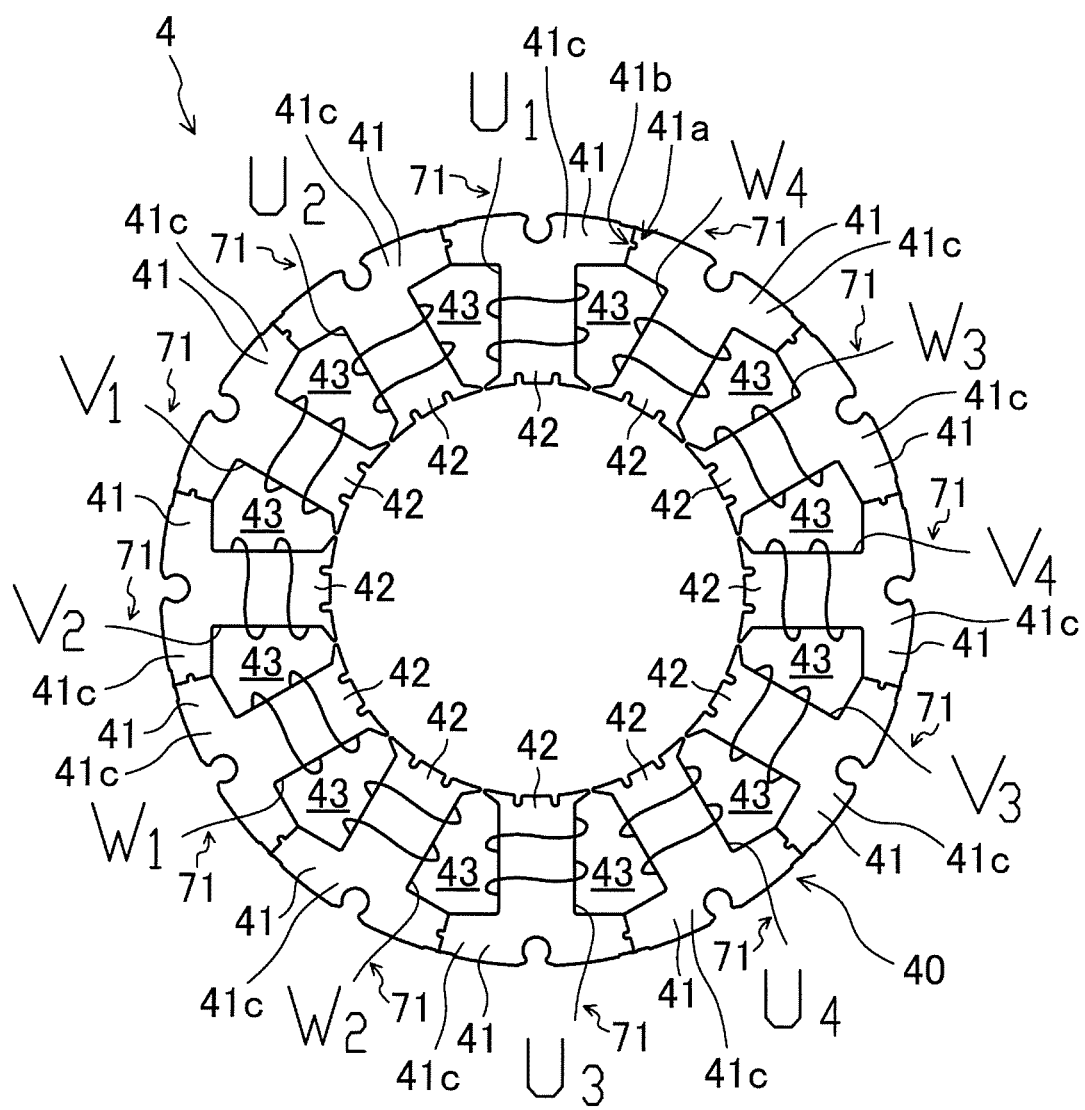
FIG. 3 is a general schematic view of a stator.

FIG. 1 is a top view of a motor according to this embodiment. FIG. 2 is an equivalent circuit diagram of the motor shown in FIG. 1. FIG. 3 is a general schematic view of a stator 4 as viewed along the axis of a shaft 2. For convenience of description, some components and their functions are not shown in FIGS. 1 and 3 and description thereof will be omitted. For example, frames and bus bars are not shown. An exterior body housing the stator 4 is not shown, either. The exterior body is in the shape of, for example, a cylinder, a substantial cuboid, a substantially rectangular cuboid, or a polygonal prism made of metal. The shape is selected as appropriate in accordance with the specifications of a motor 1. FIG. 3 shows none of insulators 5. The components are simply shown. For example, the shapes of the insulators 5 shown in FIG. 1 are partially different from the actual shapes. The shapes of the coils U1 to W4 and their lead terminals 71 shown in FIG. 3 are largely different from the actual shapes. In FIG. 2, symbols + indicate the start of winding of coils; whereas, symbols − indicate the end of winding of the coils.

In the following description, the longitudinal direction of the shaft 2 may be referred to as an axial direction, the radial direction of the stator 4 as a radial direction, and the circumferential direction of the stator 4 as a circumferential direction. In the axial direction, the lead terminals 71 of the coils are positioned on one side of the stator 4. This side may be referred to as an upper side, whereas the opposite as a lower side. In the radial direction, the stator 4 has the shaft 2 and a rotor at its center, which may be referred to as an inner side, whereas the opposite where a stator core 40 is located as an outer side.

The direction in which electromagnetic steel sheets are stacked is the same as the axial direction, which are used as synonymous.

In the following description, the terms "tooth" and "teeth" (the plural of tooth) will be used separately. A plurality of teeth protruding toward the center of a ring stator core are referred to as teeth (the plural of tooth 42). Each of the teeth of the stator core 40 is referred to as a tooth 42. Similarly, the plurality of teeth of core segments 41, which will be described later, are referred to as teeth 42. Each of the teeth of the core segments 41 is referred to as a tooth 42. Patent Documents 3 and 4 described above are known documents using the terms "tooth" and "teeth" (the plural of tooth) separately.

The motor 1 includes a rotor 3, the stator 4, and the coils U1 to W4 inside an exterior body (not shown). The rotor 3 includes the shaft 2 as the rotation axis of the motor 1.

The rotor 3 is in contact with the outer circumference of the shaft 2, and includes magnets 31 facing the stator 4, with N and S poles arranged alternately along the outer circumference of the shaft 2. The magnets 31 used for the rotor 3 are neodymium magnets in this embodiment. However, the materials, shapes, and characteristics of the magnets may be changed as appropriate in accordance with the output of the motor, for example. As viewed in the axial direction, the rotor 3 is disposed radially inside, and at a certain distance from, the stator 4.

The stator 4 is in the shape of a cylinder formed by connecting a plurality of stator segments 40a in a ring. Each of the stator segments 40a is formed as follows. The insulators 5 are attached to both the axially upper and lower end surfaces of the tooth 42 of each core segment 41. Insulators such as insulating paper 6 are attached between the insulators 5. A winding wire is wound around a part 50 of each insulator 5 to be wound with a coil, and the part to be provided with an insulator such as the insulating paper 6 to form the coil U1, for example. The appearance shape of the stator segment 40a formed as described above is a column with a substantially sector cross-section.

The stator 4 and the stator segments 40a include the plurality of core segments 41 and teeth 42 protruding radially inward from the inner peripheries of the respective core segments 41. Each core segment 41 is a multilayer of sheets (i.e., core segment sheets) punched out of an electromagnetic steel sheet containing, for example, silicon. The sheets (i.e., core segment sheets) are pieces constituting a part of the stator core sheet shaped into a substantial ring. The appearance shape of each core segment 41 configured as described above is a column with a cross-section in the shape of the piece constituting the part of the substantial ring stator core sheet. The sheets are stacked in the normal direction of the surfaces of the sheets. Each core segment 41 includes a yoke 41c and one of the teeth 42 protruding from a substantial center of the yoke 41c.

Each core segment 41 has a recess 41a in one side surface of and a projection 41b in the other side surface of the yoke 41c positioned circumferentially. Both the recess 41a and the projection 41b extend across axial direction on the side surfaces. Focusing on one core segment 41 (here referred to as "this core segment 41"), the projection 41b of the core segment 41 circumferentially adjacent to this core segment 41 on one side is fitted into the recess 41a of this core segment 41. The projection 41b of this core segment 41 is fitted into the recess 41a of the core segment 41 circumferentially adjacent to this core segment 41 on the other side. Accordingly, the core segments are connected. In this manner, the circumferentially adjacent core segments 41 are fitted into and connected to each other to form the ring stator core 40.

As shown in FIGS. 1 and 3, the core segments 41 are connected to each other to form the ring stator core 40, thereby arranging the teeth 42 at equal intervals along the inner circumference of the stator core 40. The gaps between the circumferentially adjacent teeth 42 serve as slots 43.

The stator 4 includes twelve coils U1 to W4, which are attached to the teeth 42 through the insulators 5 and the insulating paper 6 (see FIGS. 4A to 4D) and are disposed in the slots 43 as viewed in the axial direction. Although not shown, the coils U1 to W4 are winding wires made of a metal material, such as copper, with a surface coated with an insulator film, and having a circular cross-section. The coils U1 to W4 are wound around insulators 5 by multi-ply regular winding. The term "circular" meant here includes machining tolerances and deformation of the coils when the coils are wound around the teeth 42. This applies to the following description. In the following description, unspecified one of the coils U1 to W4 representing their structure and other features is referred to as a coil 7.

As shown in FIG. 2, the coils U1 to U4, V1 to V4, and W1 to W4 are connected in series, and the three U, V and W phases are star-connected. The coils U1 to U4, V1 to V4, and W1 to W4 are supplied with currents of the three U, V and W phases, respectively, with a phase difference of 120° in electrical angle and excited to generate a rotating magnetic field. This rotating magnetic field generates torque in the rotor 3, and the shaft 2 rotates while being supported by a bearing (not shown).

In this embodiment, the number of magnetic poles of the rotor 3 is ten: five N poles opposed to the stator 4 and five S poles, whereas the number of slots 43 is 12. The numbers are not limited thereto and other number combinations of the magnetic poles and slots are also applicable.

[Configurations of Core Segment and Main Part of Insulator]

Figure 4C:
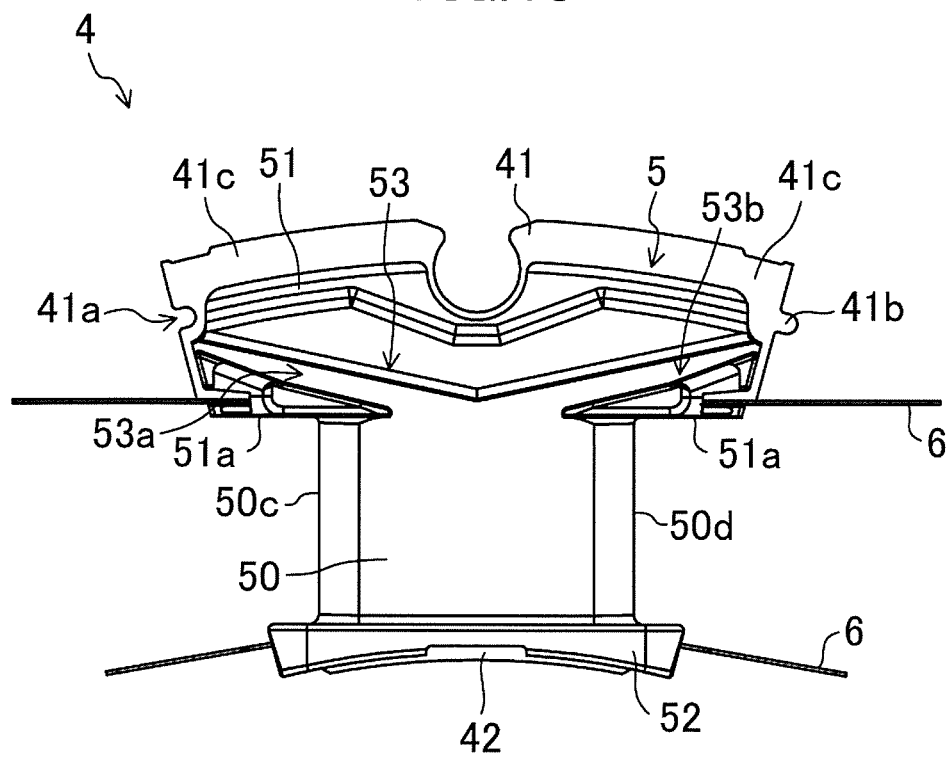
FIG. 4C is a top view of the structure shown in FIG. 4A as viewed in an axial direction.
Figure 4C:
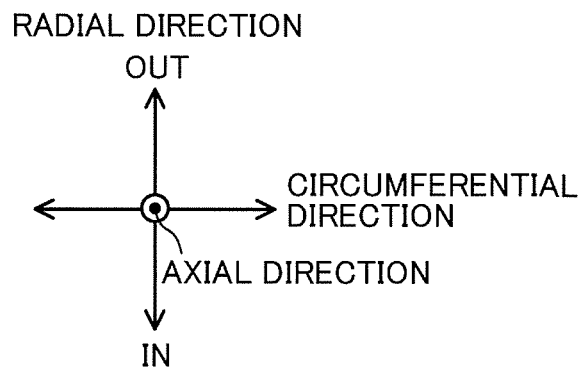

FIGS. 4A to 4D show the part surrounded by a broken line in FIG. 1. FIG. 4A is a perspective view, FIG. 4B is a side view in the radial direction, FIG. 4C is a top view in the axial direction, and FIG. 4D is a side view in the circumferential direction. For convenience of description, none of FIGS. 4A to 4D shows the coil 7. The figures also show the insulating paper 6 sandwiched and attached among the insulators 5, the core segment 41, and the tooth 42. However, shown here is the state before the insulating paper 6 is folded to be housed in the slot 43.

As shown in FIGS. 4A to 4D, the insulators 5 in the same shape are attached to both the axially upper and lower end surfaces of the tooth 42 protruding from one core segment 41. The insulating paper 6 is sandwiched among the core segment 41, the tooth 42, and the insulators 5. In this manner, the insulators 5 cover both the axial end surfaces of the tooth 42 and the vicinities of both the end surfaces.

Each of the insulators 5 is an insulating member formed by molding an insulating resin material, and includes the part 50 to be wound with the coil 7 (see FIG. 5B), a first flange 51, and a second flange 52. The first flange 51 is formed at one end of the part 50 continuously with the part 50. The second flange 52 is formed at the other end of the part 50 continuously with the part 50. In this embodiment, the first flange 51 is attached closer to the core segment 41, that is, the proximal end of the tooth 42, whereas the second flange 52 is attached closer to the distal end of the tooth 42 located radially inside the stator 4. The first flange 51 has a coil guide groove 53. To be wound around the part 50, the winding wire of the coil 7 passes through the coil guide groove 53. The winding starting part comes into contact with an inner surface 51a of the first flange 51 (hereinafter referred to as the "inner surface 51a of the first flange 51") facing the second flange 52 to be guided to the part. 50. In this specification, the winding starting part of the coil 7 corresponds to the vicinity of the first turn of the first layer of the coil 7 wound around the part 50.

Out of the outer circumferential surface of the part 50 around which the coil is wound, outer circumferential surfaces 50a and 50b covering both the axial end surfaces of the tooth 42 are slopes. Each slope is inclined monotonically so that the height from the axially upper or lower surface of the tooth 42 increases from the first flange 51 toward the second flange 52. Out of the outer circumferential surface of the part 50 to be wound with the coil, outer circumferential surfaces 50c and 50d covering both the circumferential end surfaces of the tooth 42 are orthogonal to the axially upper surface of the tooth 42. The term "orthogonal" meant here includes the machining tolerances of the insulators 5 and the tooth 42, and the election tolerances when attaching the insulators 5 to the tooth 42. The term "parallel" meant here includes the machining tolerances of the insulators 5 and the election tolerances when attaching the insulators 5 to the tooth 42. These apply to the following description.

The inner surface 51a of the first flange 51 is parallel to a plane orthogonal to the axially upper or lower surface of the tooth 42.

The coil guide groove 53 includes a first guide groove 53a and a second guide groove 53b that are symmetrical with respect to a radial plane. Each of the first and second guide grooves 53a and 53b extends at an acute angle θ from the inner surface 51a of the first flange 51. This configuration also allows a coil 7 wound in a different direction to be guided to the part 50 (see FIGS. 5A and 5B). The structure of the coil guide groove 53 will be described later in detail.

The insulators 5 function to electrically insulate the divisional core 41 and the tooth 42 from the coil 7, together with the insulating paper 6. The insulators 5 also function to stably maintain the regular winding of the coil 7, which will be described later.

The insulating paper 6 is impregnated with an insulating oil, for example, covers both the circumferential side surfaces of the tooth 42, and partially overlaps the first and second flanges 51 and 52 of the insulators 5 in the axial direction. Although not shown in the figure, when the motor 1 is assembled, the insulating paper 6 is folded to cover the insides of the slots 43. This configuration electrically insulates the core segment 41 and the tooth 42 from the coil 7, and from the circumferentially adjacent core segments 41 and teeth 42.

[Configuration of Main Part of Insulator]

Figure 5A:
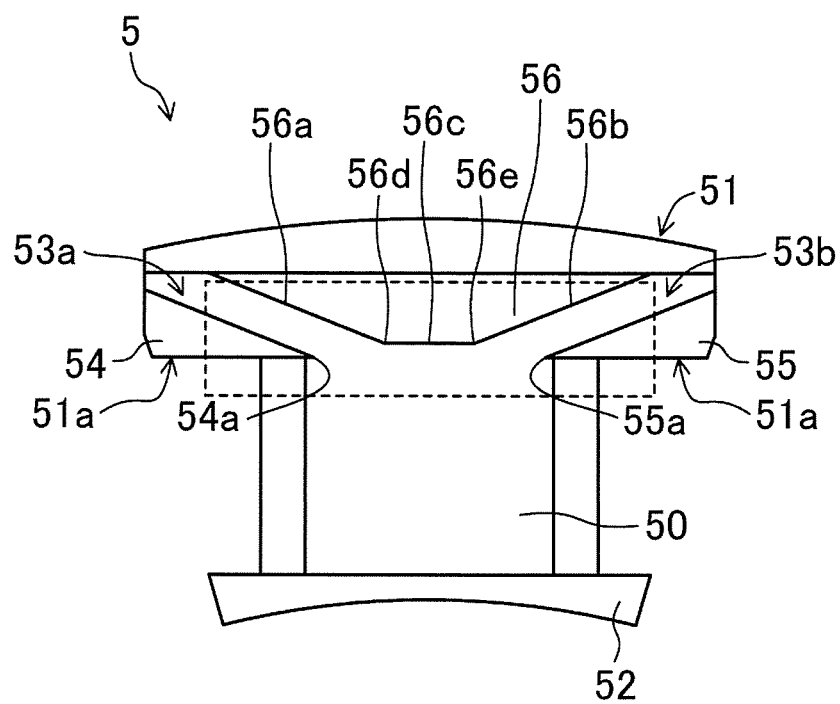
FIG. 5A is a schematic view of a main part of an insulator according to Embodiment 1 as viewed in the axial direction.
Figure 5C:
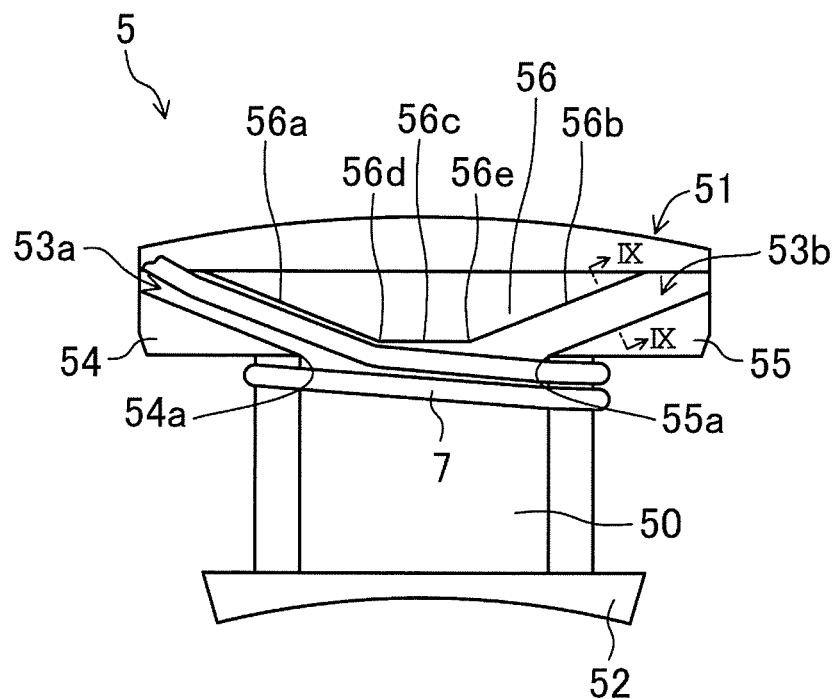
FIG. 5C is a schematic view of a main part of an insulator wound with a coil according to a first embodiment, as viewed in the axial direction.
Figure 5C:
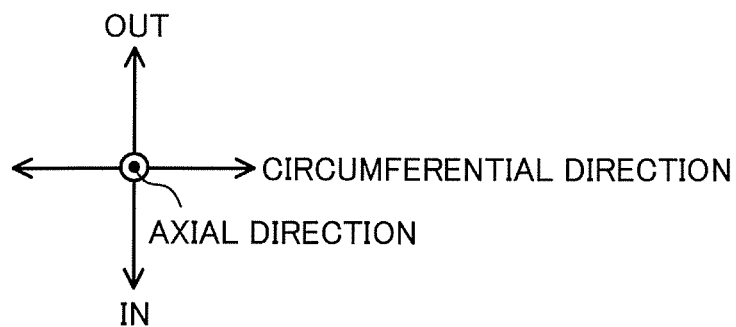

FIG. 5A is a schematic view of a main part of each insulator according this embodiment as viewed in the axial direction. FIG. 5B is an enlarged schematic view of the part surrounded by a broken line shown in FIG. 5A. FIG. 5C is a schematic view of the main part of the insulator wound with the coil as viewed in the axial direction. While the insulator 5 shown in FIGS. 5A to 5C is the same as that in FIGS. 4A to 4D, the structure of the insulator 5 is simply shown in FIGS. 5A to 5C for convenience of description.

As shown in FIGS. 5A to 5C, the first flange 51 of the insulator 5 includes three parts, first to third parts 54 to 56 in the region other than the first guide groove 53a and the second guide groove 53b as viewed in the axial direction.

The radially inner surface of the first part 54 is a part of the inner surface 51a of the first flange 51, whereas the radially outer surface of the first part 54 serves as one side surface of the first guide groove 53a. That is, as viewed in the axial direction, the first part 54 is located between the first guide groove 53a and the part 50 to be wound with the coil. A first end 54a of the first part 54 is located at the opening end of the first guide groove 53a closer to the second flange 52, and faces the second part 55.

The radially inner surface of the second part 55 is another part of the inner surface 51a of the first flange 51, whereas the radially outer surface of the second part 55 serves as one side surface of the second guide groove 53b. That is, as viewed in the axial direction, the second part 55 is located between the second guide groove 53b and the part 50 to be wound with the coil. A second end 55a of the second part 55 is located at an opening end of the second guide groove 53b closer to the second flange 52, and faces the first part 54.

The third part 56 is interposed between the first and second guide grooves 53a and 53b as viewed in the axial direction. Out of the radially inner side surface of the third part 56, a surface 56a on one circumferential side serves as the other side surface of the first guide groove 53a. A surface 56b on the other circumferential side serves as the other side surface of the second guide groove 53b. In addition, the radially inner side surface of the third part 56 has a surface 56c that is parallel to the inner surface 51a of the first flange 51. The parallel surface 56c is located more radially outward in relation to the inner surface 51a of the first flange 51 as viewed in the axial direction. The parallel surface 56c has corners 56d and 56e at ends. The corner 56d is located at the opening end of the first guide groove 53a closer to the second flange 52. The corner 56e is located at the opening end of the second guide groove 53b closer to the second flange 52.

As shown in FIG. 5B, an imaginary plane parallel to the axial direction and passing through the corner 56d and the second end 55a of the second part 55 forms an angle θ1 with the inner surface 51a of the first flange 51. An imaginary plane parallel to the axial direction and passing through the corner 56e and the first end 54a of the first part 54 forms an angle θ2 with the inner surface 51a of the first flange 51. Corners 56d and 56e and the first and second ends 54a and 55a are arranged so that the angles θ1 and θ2 are both acute and lower than or equal to the angle θ described above.

As shown in FIG. 5C, the coil 7 is housed in the first guide groove 53a and is further guided to the part 50. At this time, as viewed in the axial direction, the coil 7 is guided at the angle θ from the inner surface 51a of the first flange 51 in the first guide groove 53a. Then, the coil 7 abuts on the corner 56d of the third part 56 and the second end 55a of the second part 55 from the opening end of the first guide groove 53a closer to the second flange 52 toward the second part 55. The coil 7 is eventually guided to the part 50 at the angle θ1 from the inner surface 51a of the first flange 51.

Advantages of this Embodiment

As described above, in each insulator 5 according to this embodiment, the first guide groove 53a of the coil guide groove 53 and the inner surface 51a of the first flange 51 form the acute angle θ. This configuration facilitates the winding of the coil 7 along the inner surface 51a of the first flange 51 and reduces winding failure at the winding starting part of the coil 7 to easily provide a regularly wound coil 7. This configuration also easily provides a regularly wound coil 7, even if its diameter is changed. The insulators 5 according to this embodiment are useful to regularly wind the oil 7 in n layers, where n is an integer of 2 or more.

Even if the diameter of the coil 7 is changed, there is no need to change the width of the groove for holding the coil in the insulator as disclosed in Patent Document 2. There is also no need to change the width of the step or the angle of the slope in the insulator as disclosed in Patent Document 1. The configuration according to this embodiment reduces an increase in the manufacturing costs of the insulators 5. Even if coils 7 with different diameters are used together with the core segments 41 and the teeth 42 with the same specifications, the one type of insulators 5 suffices, thereby reducing the costs in developing various types of motors.

The configuration according to this embodiment reduces deformation, movement, and the resulting winding failure of the coil 7 at winding starting part to easily provide a regularly wound coil 7.

Figure 6A:
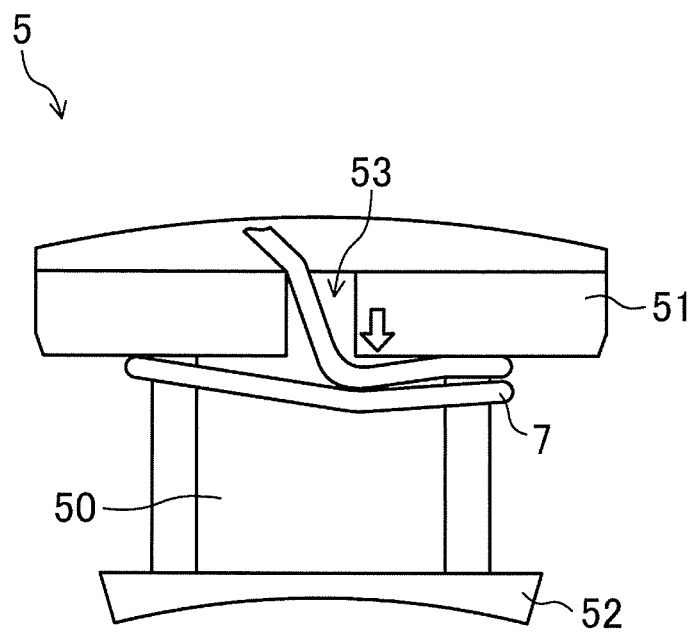
FIG. 6A is a schematic view of a main part of a comparative insulator wound with a coil, as viewed in the axial direction.
Figure 6A:
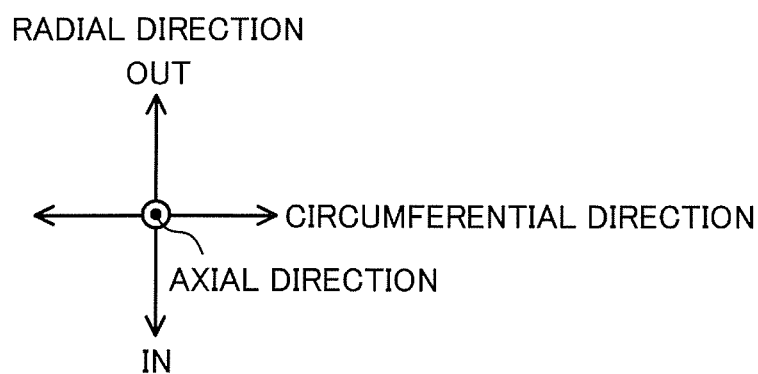
Figure 6B:
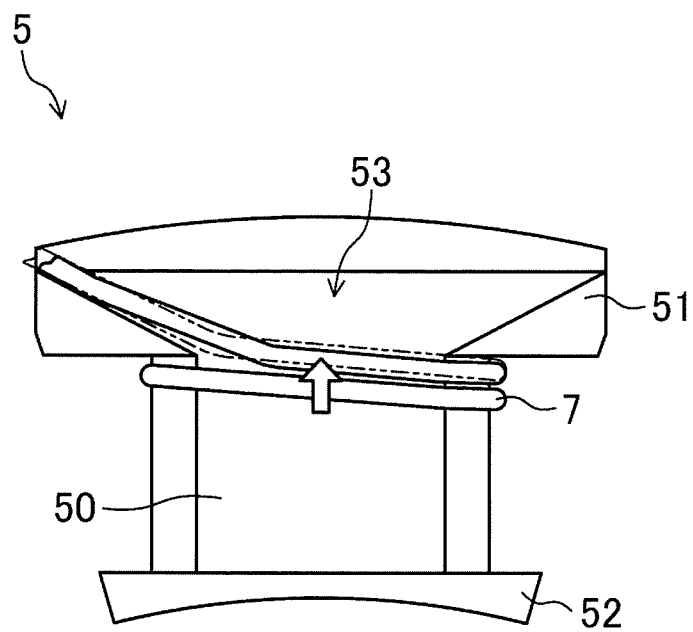
FIG. 6B is a schematic view of a main part of another comparative insulator wound with a coil, as viewed in the axial direction.
Figure 6B:
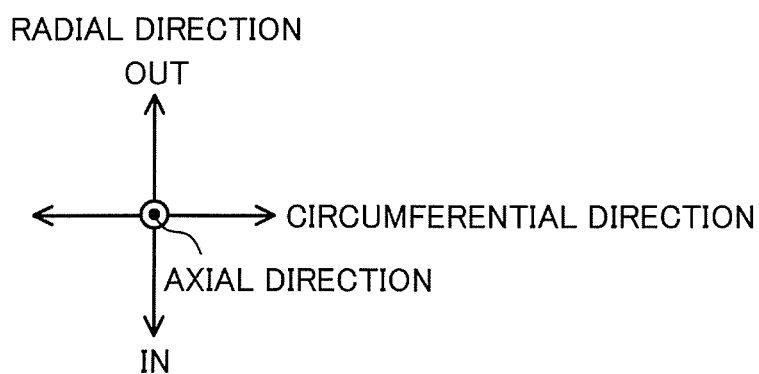

FIG. 6A is a schematic view of a main part of a comparative insulator wound with a coil, as viewed in the axial direction. FIG. 6B is a schematic view of a main part of another comparative insulator, as viewed in the axial direction.

As shown in FIG. 6A, the coil guide groove 53 with a smaller width is likely to cause radially inward deformation of the coil 7 at the boundary at which the coil 7 is guided from the coil guide groove 53 to the part 50. This is because the direction of winding of the coil 7 largely changes at the boundary. If such deformation occurs, the winding starting part of the coil 7 is not regularly wound around the part 50, thereby failing to achieve regular winding of the coil 7.

As shown in FIG. 6B, the coil guide groove 53 with a greater width is less likely to cause the above-described deformation of the coil 7 at the boundary. In the process of regularly winding the coil 7 around the part 50, the coil 7 is wound tightly not to leave any gap between turns. A radially outward force is thus applied to the winding starting part of the coil 7. This force deforms the winding starting part of the coil 7 inside the coil guide groove 53, that is, radially outward. Accordingly, winding failure occurs at the winding starting part of the coil 7 as seen in FIG. 6A, thereby failing to achieve regular winding of the coil 7 around the part 50.

By contrast, as shown in FIG. 5C, in the insulator 5 according to this embodiment, the coil 7 obliquely enters the part 50 without significantly changing the width of the first guide groove 53a. This is less likely to cause radially inward deformation of the coil 7 at the boundary as shown in FIG. 6A. This is also less likely to cause radially outward deformation of the coil 7 at the boundary as shown in FIG. 6B. Accordingly, the configuration allows regular winding of the coil 7 around the part 50 from the winding starting part to provide a regularly wound coil 7.

As shown in FIG. 5B, in each insulator 5 according to this embodiment, the first guide groove 53a and the inner surface 51a of the first flange 51 form the angle θ. On the other hand, the imaginary plane (not shown) parallel to the axial direction and passing through the corner 56d and the second end 55a of the second part 55 forms the angle θ1, where θ1≤θ, with the inner surface 51a of the first flange 51. To be wound around the part 50, the coil 7 is thus guided at the angle θ from the inner surface 51a of the first flange 51 in the first guide groove 53a. Then, the coil 7 abuts on the corner 56d of the third part 56 and the second end 55a of the second part 55 from the opening end of the first guide groove 53a closer to the second flange 52 toward the second part 55. The coil 7 is eventually guided to the part 50 at the angle θ1 from the inner surface 51a of the first flange 51. This gradually reduces the angle at which the coil 7 enters the part 50, and allows the coil 7 to be wound further along the inner surface 51a of the first flange 51. Even upon receipt of a radially outward force at the time of winding, the coil 7 comes into contact with the parallel surface 56c of the third part 56 and to be less deformed. These improve the regularity of the winding starting part of the coil 7, thereby easily providing a regularly wound coil 7.

Although not shown, being wound in the direction opposite to that in FIG. 5C, the coil 7 is guided at the angle θ from the inner surface 51a of the first flange 51 in the second guide groove 53b. Then, the coil 7 abuts on the corner 56e of the third part 56 and the first end 54a of the first part 54 from the opening end of the second guide groove 53b closer to the second flange 52 toward the first part 54. The coil 7 is eventually guided to the part 50 at the angle θ2, where θ2≤θ, from the inner surface 51a of the first flange 51. As described above, this improves the regularity of the winding starting part of the coil 7, thereby easily providing a regularly wound coil 7.

In this manner, the insulator 5 according to this embodiment is applied to the cases where the coil 7 is wound clockwise and counterclockwise. In the motor 1 shown in FIG. 1, for example, the U-phase coils U1 and U2 may be wound with the same winding wire but the coil U1 may be wound clockwise and U2 counterclockwise, depending on the specifications. According to this embodiment, the coils U1 and U2 are regularly woundable around the insulators 5 with the same structure in the same or similar manner. The equal angles θ1 and θ2 equalize the angles at which the winding starting parts of the coils 7 enter the respective parts 50, if the coils 7 are wound in different directions. These only require a change in the direction of winding and the locations of the coils to the opposite in the winding process of the coils 7, and thus simplifies the process.

As shown in FIGS. 4A to 4D, the insulating paper 6 covers the insulator 5 and the tooth 42 to partially overlap the first and second flanges 51 and 52 of the insulator 5 in the axial direction. The insulator 5 according to this embodiment includes the first and second guide grooves 53a and 53b to allow the coil 7 to obliquely enter the part 50. The coil 7 is thus woundable around the part 50 while avoiding the insulating paper 6. This reduces contact between the insulating paper 6 and the coil 7 near the first flange 51. This reduces damage of the insulating paper 6 and maintains insulation between the coil 7 and the tooth 42.

Application of the insulator 5 according to this embodiment to the stator 4 of the motor 1 shown in FIG. 1, for example, achieves regular winding of the coil 7, and reduces the dead space of the part 50 not wound with the coil 7. This increases the space factor of the coil 7 in the slot 43 and the efficiency of the motor 1.

Note that the third part 56 may exclude the parallel surface 56c.

Figure 7A:
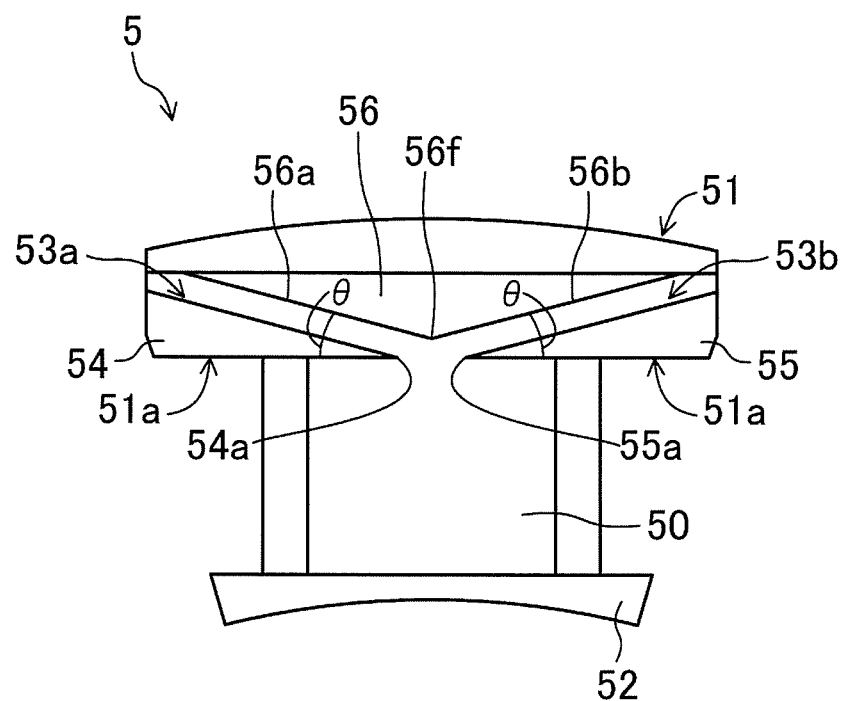
FIG. 7A is a schematic view of a main part of another insulator as viewed in the axial direction.
Figure 7A:
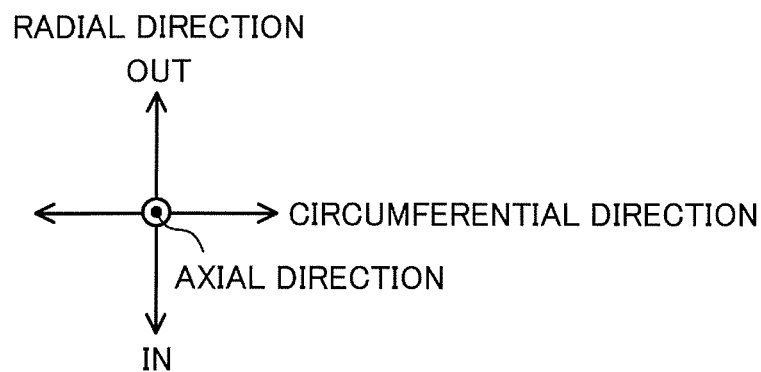

FIG. 7A is a schematic view of a main part of another insulator according to this embodiment as viewed in the axial direction. FIG. 7B is a schematic view of a main part of further another insulator as viewed in the axial direction. For convenience of description, the structure of the insulator 5 in FIGS. 7A and 7B is simplified.

As shown in FIG. 7A, a surface 56a and a surface 56b of the third part 56 are continuous. A corner 56f is located at the junction between the surfaces 56a and 56b. The corner 56f is located radially outward in relation to the inner surface 51a of the first flange 51 as viewed in the axial direction. In this case as well, an imaginary plane (not shown) parallel to the axial direction and passing through the corner 56f of the third part 56 and the second end 55a of the second part 55 forms the angle θ1, where θ1≤θ, with the inner surface 51a of the first flange 51. On the other hand, an imaginary plane (not shown) parallel to the axial direction and passing through the corner 56f of the third part 56 and the first end 54a of the first part 54 forms the angle θ2, where θ2≤θ, with the inner surface 51a of the first flange 51. This configuration improves the regularity of the winding starting part of the coil 7, thereby easily providing a regularly wound coil 7. In addition, the coil 7 comes into contact with the corner 56f to reduce radially outward deformation of the winding starting part of the coil 7.

As shown in FIG. 7B, a curved surface 56g may be interposed between the surfaces 56a and 56b of the third part 56. In this case, the coil 7 comes into contact with a corner 56g1 or 56g2 of the curved surface 56 to be guided to the part 50. The curvature of the curved surface 56g or the distance between the inner surface 51a of the first flange 51 and the curved surface 56g as viewed in the axial direction may be adjusted. This provides a desired angle between the coil 7 and the inner surface 51a of the first flange 51, from the terminal of the first guide groove 53a toward the second part 55 or from the terminal of the second guide groove 53b to the first part 54. In addition, the coil 7 comes into contact with the corner 56g1 or 56g2 of the curved surface 56g to reduce radially outward deformation of the winding starting part of the coil 7. Same as shown in FIG. 7A, this case allows adjustment of the angle for guiding the coil to improve the regularity of the winding starting part of the coil 7, thereby easily providing a regularly wound coil 7. The parallel surface 56c, the corner 56f, or the apex of the curved surface 56g of the first flange 51 is located radially outward in relation to the inner surface 51a of the first flange 51 as viewed in the axial direction. This arrangement provides the angles θ1 and θ2 lower than or equal to the angle θ, thereby allowing tighter winding of the coil 7 along the inner surface 51a of the first flange 51 as described above.

Second Embodiment

In order to achieve regular winding of the coil 7, it is also important to fix the winding starting part of the coil 7 to reduce the deformation and movement of the winding starting part.

Figure 8:
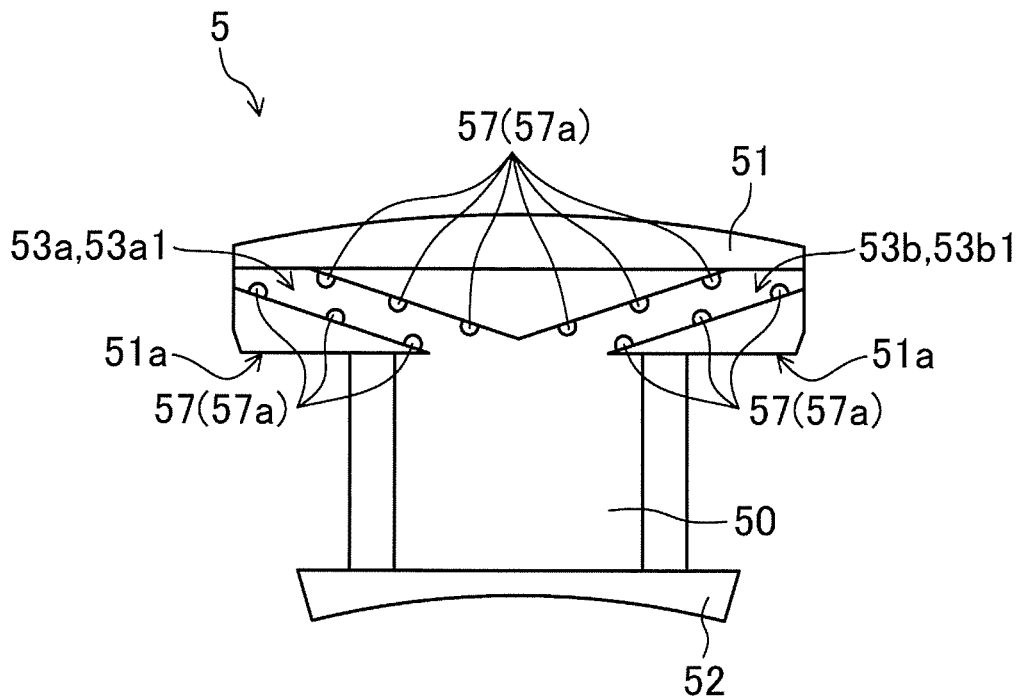
FIG. 8 is a schematic view of a main part of an insulator according to a second embodiment as viewed in the axial direction.
Figure 8:
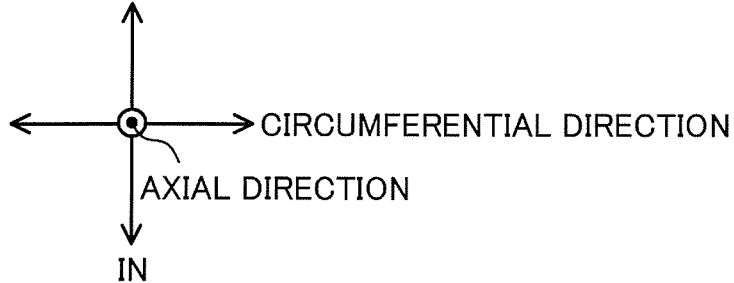
Figure 9:
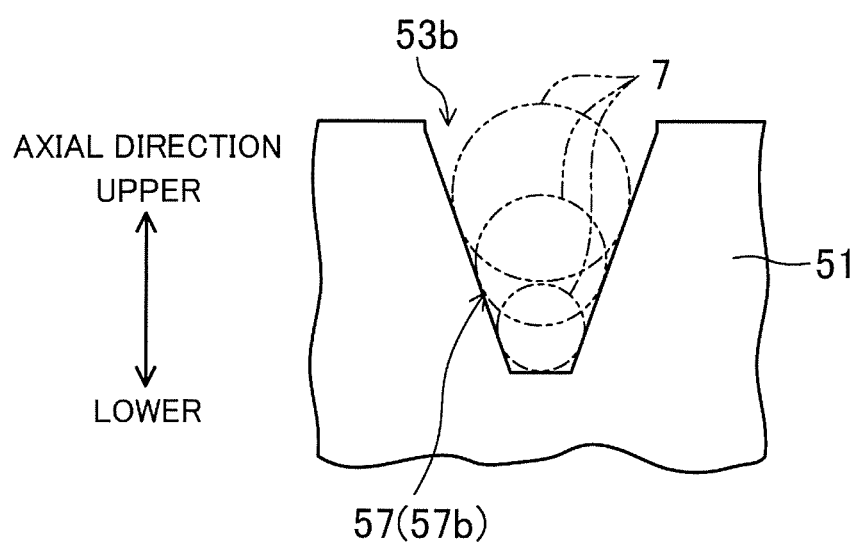
FIG. 9 is a schematic cross-sectional view of a second groove of another insulator according to the second embodiment.

FIG. 8 is a schematic view of a main part of an insulator according this embodiment as viewed in the axial direction. The coil guide groove 53 includes coil locks 57. FIG. 9 is a schematic cross-sectional view of a second groove of another insulator according to this embodiment, and corresponds to the cross-section taken along line IX-IX of FIG. 5C. For convenience of description, the structure of the insulator 5 is simply shown in FIGS. 8 and 9.

As shown in FIG. 8, protrusions 57a, which protrude from the side surfaces of the first and second guide grooves 53a and 53b into the groove, serve as the coil locks 57. The circumferential length of the protrusions 57a may be determined based on the widths of the first and second guide grooves 53a and 53b and the diameter of the coil 7, and adjusted to an extent not to excessively deform the coil 7. Such projections 57a lock the coil 7 inside the first guide groove 53a or the second guide groove 53b, thereby reducing deformation and movement of the winding starting part of the coil 7. This improves the regularity of the winding start part of the coil 7, thereby easily providing a regularly wound coil 7. In particular, arrangement of the protrusions 57a at an inlet 53a1 of the first guide groove 53a, through which the coil 7 is guided from the outside of the insulator 5, allows more reliable locking of the winding start part of the coil 7 in the insulator 5. This is because the coil 7 bends radially to allow the force to concentrate at the contacts between the protrusions 57a and the coil 7. This applies to the outlet of the coil 7. Arrangement of the protrusions 57a at an outlet 53b1 of the second guide groove 53b allows more reliable locking of the winding end part of the coil 7 in the insulator 5. In this case, the inlet 53a1 of the first guide groove 53a corresponds to the inlet of the coil 7, whereas the outlet 53b1 of the second guide groove 53b corresponds to the outlet of the coil 7. Note that one or more protrusions 57a may be provided on the side surfaces of the first and second guide grooves 53a and 53b, respectively. Arrangement of the projections 57a on both the side surfaces or in a plurality of positions of the first and second guide grooves 53a and 53b allows more reliable locking of the winding starting part of the coil 7 in the insulator 5. Depending on the direction of winding of the coil 7, the outlet 53b1 of the second guide groove 53b may correspond to the inlet of the coil 7, whereas the inlet 53a1 of the first guide groove 53a may correspond to the outlet of the coil 7. Arrangement of the protrusions 57a at at least one of the inlet or outlet 53a1 or 53b1 allows reliable locking of the winding starting or end part of the coil 7 in the insulator 5.

As shown in FIG. 9, the first and second guide grooves 53a and 53b may be tapered toward their bottoms as tapered grooves 57b that serve as the coil locks 57. Employment of this configuration allows locking of the winding starting or end part of the coil 7 in the insulator 5 without changing the shapes of the first and second guide grooves 53a and 53b even if the diameter of the coil 7 is changed. The whole or part of first and second guide grooves 53a and 53b may be tapered. If the protrusions 57a are arranged and the diameter of the coil 7 is substantially equal to the widths of the first and second guide grooves 53a and 53b, there is no need to taper the first or second guide groove 53a or 53b.

Tapering of the inlet 53a1 of the first guide groove 53a or the outlet 53b1 of the second guide groove 53b allows reliable locking of the winding starting or end part of the coil 7 in the insulator 5.

Assume that one of the first and second guide grooves 53a and 53b is used for the winding start of the coil 7 and the other includes the coil lock(s) 57. In this case, the winding end part of the coil 7 may pass through the other guide groove to reduce slack of the winding end part of the coil 7 to allow reliable locking of the coil 7 in the insulator 5 and easily provide a regularly wound coil 7.

At least one of the first and second guide grooves 53a and 53b may include the coil lock(s) 57. Arrangement of the coil locks 57 in at least one position of the inlet 53a1 of the first guide groove 53a and the outlet 53b1 of the second guide groove 53b allows more reliable locking of the winding starting or end part of the coil 7 in the insulator 5.

In the first and second embodiments, the parallel surface 56c or the corner 56f of the first flange 51 is located more radially outward in relation to the inner surface 51a of the first flange 51 as viewed in the axial direction. Alternatively, the parallel surface 56c or the corner 56f may be located in the same position as the inner surface 51a. In this case, the coil 7 enters the part 50 at an angle θ to be wound. Further, the apex of the curved surface 56g may be located in the same position as the inner surface 51a of the first flange 51 as viewed in the axial direction.

In the first and second embodiments, an example has been described where the coil 7 is started to be wound from the first flange 51 located at the core segment 41 which is the proximal end of the tooth 42. The configuration is not particularly limited thereto. The coil 7 may be started to be wound from the second flange 52 located at the distal end of the tooth 42. In this case, the second flange 52 has the coil guide groove 53. While an example has been described where the coil 7 is made of the winding wire with a circular cross-section, the configuration is not particularly limited thereto. The coil 7 may be made of a winding wire with a quadrangular cross-section, for example. How to wind the coil 7 is not particularly limited, and general nozzle winding or flyer winding may be employed, for example.

An example has been described where the insulators 5 are of what is called a split type and attached to the associated tooth 42 from above and below. The configuration is not particularly limited thereto. Each insulator 5 may have an integral structure including a tubular part 50 to be wound with the coil to cover the entire outer circumference of the tooth 42. Such an insulator 5 with an integral structure may be used, if the stator 4 is formed by attaching the teeth 42 to the respective core segments 41 afterwards, for example. Alternatively, the insulators 5 attached to one tooth from above and below do not have to have the same shape. The insulator 5 at the winding starting point of the coil 7 only needs to have the coil guide groove 53 in the shape described in the first and second embodiments. The insulators 5 attached to one tooth from above and below have the same shape. The use of such insulators 5 reduces the number of types of the insulators 5 to reduce the manufacturing costs, for example.

The outer peripheral surfaces 50a and 50b of the part 50 to be wound with the coil may be substantially parallel to the axially upper surface of the tooth 42. The inner surface 51a of the first flange 51 may be inclined radially outward with respect to a plane orthogonal to the axially upper or lower surface of the tooth 42 as a reference plane.

It is clear that the insulators 5 according to the first and second embodiments are applicable to the coil 7 wound in one layer.

An example has been described in the first and second embodiments where the insulators 5 according to the present invention are attached to the teeth 42 of the respective core segments 41 and the coils 7 are wound around the respective parts 50 to form the stator segments 40a. The insulators 5 according to the present invention may be attached to the respective teeth 42 of the ring stator core, and the coils 7 are wound around the respective parts 50. The "ring stator core" here is formed by stacking sheets punched out of an electromagnetic steel sheet into ring shapes. The ring stator core has the plurality of teeth.

While an example has been described in the first and second embodiments where each core segment 41 has one of the teeth, each core segment 41 may have two or more of the teeth.

The motor 1 of the first embodiment is used for an inner rotor motor.

As shown in FIG. 3, each tooth 42 has two recessed grooves at its distal end (i.e., the radially inner end). These recessed grooves are also referred to as "supplemental grooves" in U.S. Pat. No. 6,104,117 and Japanese Unexamined Patent Publication No. H10-42531, for example. The "supplemental grooves" are advantages in reducing cogging torque and torque ripple in the rotation operation of the rotor 3 of the motor 1, and contribute to reduction in vibration and noise in characteristics of the motor.

The winding wires in this embodiment are also referred to as electric wires for winding and commercially available. The conductors of the winding wires or electric wires for winding contain copper or aluminum with unavoidable impurities. Unavoidable impurities here mean a tiny amount of impurity elements unavoidably mixed into copper or aluminum during the manufacturing process. For copper, unavoidable impurities may be As, Bi, Sb, Pb, Fe, S, or oxygen, for example. For aluminum, unavoidable impurities may be Si, Mn, Ti, V, Zr, Fe, or Cu, for example. The conductors of the winding wires are covered with an insulating layer made of an insulating resin. As the insulating resin, for example, polyimide, polyamide-imide, polyesterimide, polyesteramideimide, polyamide, polyhydantoin, polyurethane, polyacetal, or an epoxy resin may be selected as appropriate in accordance with the specifications of the motor 1. The cross-section of each winding wire may have various shapes, such as a substantially square shape and a substantially rectangular shape, besides the circular shape according the embodiments.

The material component of the magnets 31 according to the embodiments contains Fe or Fe and Co, as well as B and at least one kind of Sc, Y and lanthanoid-based elements. Specifically, the magnets 31 are rare earth sintered magnets, what is called neodymium sintered magnets, for example. Each rare earth sintered magnet has, as its surface layer, a rust-proof film (or a rust-proof layer) for reducing rust.

INDUSTRIAL APPLICABILITY

The insulator according to the present invention provides a regularly wound coil in accordance with the different diameter of the coil, and is thus useful for applications in, for example, motors required to have high efficiency.

DESCRIPTION OF REFERENCE CHARACTERS

1 Motor
2 Shaft
3 Rotor
4 Stator
5 Insulator
6 Insulating Paper
7 Coil
31 Magnet
40 Stator Core
40a Stator Segment
41 Core Segment
41c Yoke
42 Tooth
43 Slot
50 Part to Be Wound with Coil
51 First Flange
51a Inner Surface of First Flange 51
52 Second Flange
53 Coil Guide Groove
53a First Guide Groove
53a1 Inlet (Outlet) of First Guide Groove 53a
53b Second Guide Groove
53b1 Inlet (Outlet) of Second Guide Groove 53b
54 First Part
54a First End
55 Second Part
55a Second End
56 Third Part
56a to 56c Side Surface of Third Part 56
56d to 56f Corner
56g Side Surface (Curved Surface) of Third Part 56
57 Coil Lock
57a Projection
57b Groove
U1 to W4 Coil

The invention claimed is:

1. An insulator comprising:
a body part to be wound with a coil, the body part covering an axial end surface of a tooth protruding from a core segment and a part of at least both circumferential side surfaces of the tooth;
a first flange continuous with the body part at one of sides closer to a proximal end or a distal end of the tooth, and including a coil guide groove that guides the coil to the body part; and
a second flange continuous with the body part at the other of the sides closer to the proximal end or the distal end of the tooth, wherein:
the coil guide groove includes a first guide groove and a second guide groove symmetrical with respect to a radial plane, and each of the first and second guide grooves extends at an acute angle $\theta$ from an inner surface of the first flange facing the second flange,
the first flange includes, in a region other than the first and second guide grooves:
  a first part between the first guide groove and the body part;
  a second part between the second guide groove and the body part; and
  a third part between the first and second guide grooves,
the third part includes a first corner at an opening end of the first guide groove closer to the second flange,
a plane parallel to an axial direction and passing through the first corner and a second end of the second part, which is an opening end of the second guide groove closer to the second flange, forms an angle $\theta 1$ with the inner surface of the first flange, the angle $\theta 1$ being acute and equal to or smaller than the angle $\theta$,
the third part includes a second corner at an opening end of the second guide groove closer to the second flange,
a plane parallel to the axial direction and passing through the second corner and a first end of the first part, which is an opening end of the first guide groove closer to the second flange, forms an angle $\theta 2$ with the inner surface of the first flange, the angle $\theta 2$ being acute and equal to or smaller than the angle $\theta$,
the first and second corners are located farther from the body part in relation to the inner surface of the first flange, and
the first and second corners are connected to each other by a plane parallel to the inner surface of the first flange provided at the third part.

2. The insulator of claim 1, wherein
at least one of the first and second guide grooves includes a coil lock that locks a winding starting part or a winding end part of the coil.

3. The insulator of claim 2, wherein
the coil lock is a protrusion from a side surface of the at least one of the first and second guide grooves, and
at least one of the first and second guide grooves includes one or more protrusions including the protrusion.

4. The insulator of claim 2, wherein
at least one of the first and second guide grooves is a groove tapered toward a bottom, and
the tapered groove serves as the coil lock.

5. The insulator of claim 2, wherein
the coil lock is located at at least one of an inlet of the first guide groove and an outlet of the second guide groove.

6. A stator comprising:
insulators, each being the insulator of claim 1, on both axial end surfaces of teeth, each of which is the tooth of the core segment; and
a plurality of stator segments, each formed by winding the coil of a winding wire around the body part of the insulator, wherein
the stator segments are connected to each other in a ring, and the teeth protrude radially inward in the ring.

7. The stator of claim 6, wherein
the coil is regularly wound around the body part.

8. The stator of claim 7, wherein
a space between the teeth circumferentially adjacent to each other serves as a slot that houses the coil, and
in the slot, insulating paper that insulates associated one of the core segments and associated one of the teeth from the coil covers a side surface of the associated one of the teeth and partially overlaps the first and second flanges of the insulator in the axial direction.

9. A motor at least comprising:
the stator of claim 8; and
a rotor including a rotary shaft located more radially inward in relation to the stator at a predetermined distance.

10. A motor at least comprising:
the stator of claim 7; and
a rotor including a rotary shaft located more radially inward in relation to the stator at a predetermined distance.

11. The stator of claim 6, wherein
a space between the teeth circumferentially adjacent to each other serves as a slot that houses the coil, and
in the slot, insulating paper that insulates associated one of the core segments and associated one of the teeth from the coil covers a side surface of the associated one of the teeth and partially overlaps the first and second flanges of the insulator in the axial direction.

12. A motor at least comprising:
the stator of claim 11; and
a rotor including a rotary shaft located more radially inward in relation to the stator at a predetermined distance.

13. A motor at least comprising:
the stator of claim 6; and
a rotor including a rotary shaft located more radially inward in relation to the stator at a predetermined distance.

14. An insulator comprising:
a body part to be wound with a coil, the body part covering an axial end surface of a tooth protruding from a core segment and a part of at least both circumferential side surfaces of the tooth;
a first flange continuous with the body part at one of sides closer to a proximal end or a distal end of the tooth, and including a coil guide groove that guides the coil to the body part; and
a second flange continuous with the body part at the other of the sides closer to the proximal end or the distal end of the tooth, wherein:
the coil guide groove includes a first guide groove and a second guide groove symmetrical with respect to a radial plane, and each of the first and second guide grooves extends at an acute angle $\theta$ from an inner surface of the first flange facing the second flange,
the first flange includes, in a region other than the first and second guide grooves:
a first part between the first guide groove and the body part;
a second part between the second guide groove and the body part; and
a third part between the first and second guide grooves,
the third part includes a corner or a curved surface at an intersection between an opening end of the first guide groove closer to the second flange and an opening end of the first second guide groove closer to the second flange,
a plane parallel to an axial direction and passing through the corner or an apex of the curved surface and a second end of the second part, which is an opening end of the second guide groove closer to the second flange, forms an angle $\theta 1$ with the inner surface of the first flange, the angle $\theta 1$ being acute and smaller than the angle $\theta$,
a plane parallel to the axial direction and passing through the corner or the apex of the curved surface and a first end of the first part, which is the opening end of the first guide groove closer to the second flange, forms an angle $\theta 2$ with the inner surface of the first flange, the angle $\theta 2$ being acute and smaller than the angle $\theta$, and
the corner or the apex of the curved surface is located farther from the body part in relation to the inner surface of the first flange.

15. The insulator of claim 14, wherein
at least one of the first and second guide grooves includes a coil lock that locks a winding starting part or a winding end part of the coil.

16. The insulator of claim 15, wherein
the coil lock is a protrusion from a side surface of the at least one of the first and second guide grooves, and
at least one of the first and second guide grooves includes one or more protrusions including the protrusion.

17. The insulator of claim 15, wherein
at least one of the first and second guide grooves is a groove tapered toward a bottom, and
the tapered groove serves as the coil lock.

18. The insulator of claim 15, wherein
the coil lock is located at at least one of an inlet of the first guide groove and an outlet of the second guide groove.

19. A stator comprising:
insulators, each being the insulator of claim 14, on both axial end surfaces of teeth, each of which is the tooth of the core segment; and
a plurality of stator segments, each formed by winding the coil of a winding wire around the body part, wherein
the stator segments are connected to each other in a ring, and the teeth protrude radially inward in the ring.

20. A motor at least comprising:
the stator of claim 19; and
a rotor including a rotary shaft located more radially inward in relation to the stator at a predetermined distance.

* * * * *